Figures 1, 7, 8:
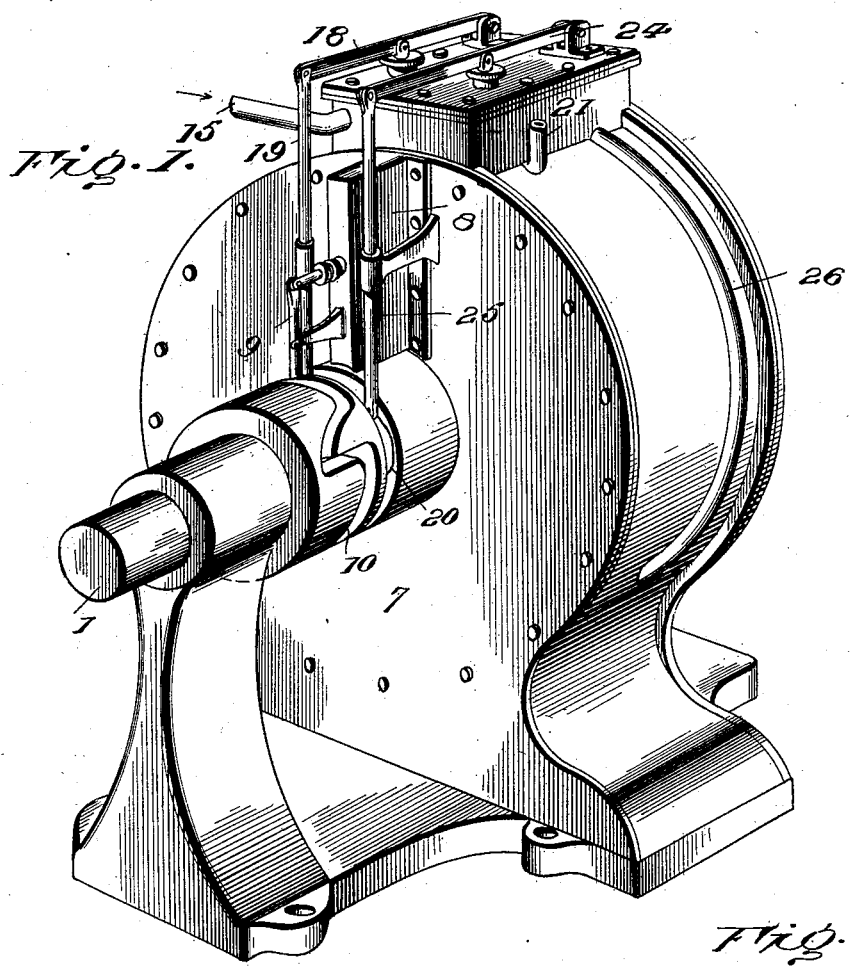

No. 715,788. Patented Dec. 16, 1902.
J. A. GROVE.
ROTARY ENGINE.
(Application filed Aug. 19, 1901.)
(No Model.) 3 Sheets—Sheet 1.

Witnesses

Inventor
John A. Grove
By
Attorneys

No. 715,788. Patented Dec. 16, 1902.
J. A. GROVE.
ROTARY ENGINE.
(Application filed Aug. 19, 1901.)
(No Model.) 3 Sheets—Sheet 2.
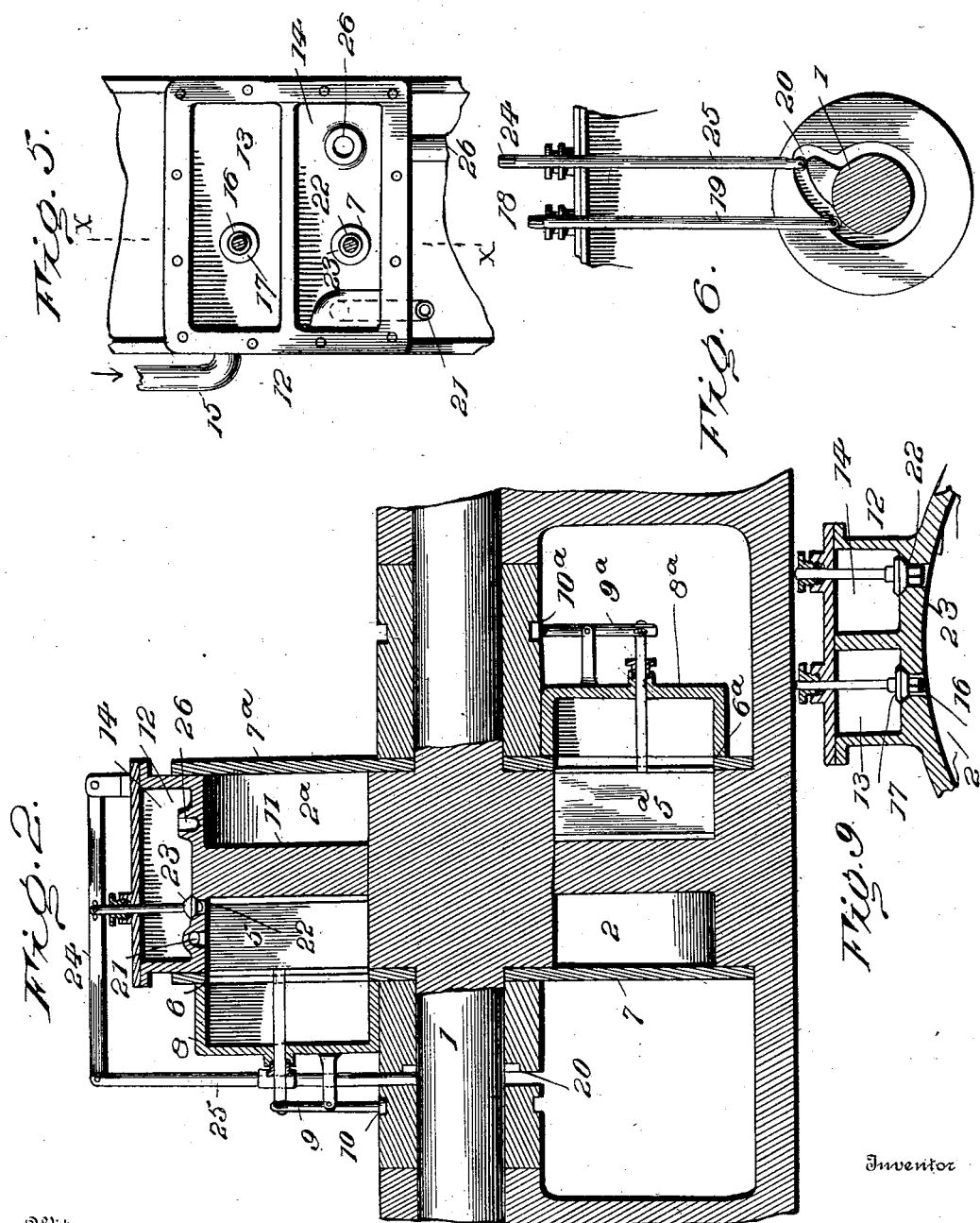

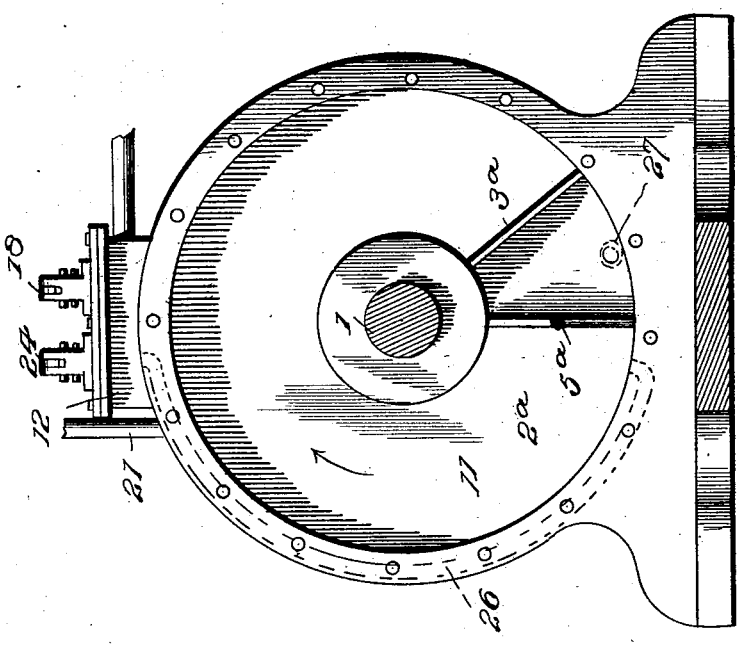
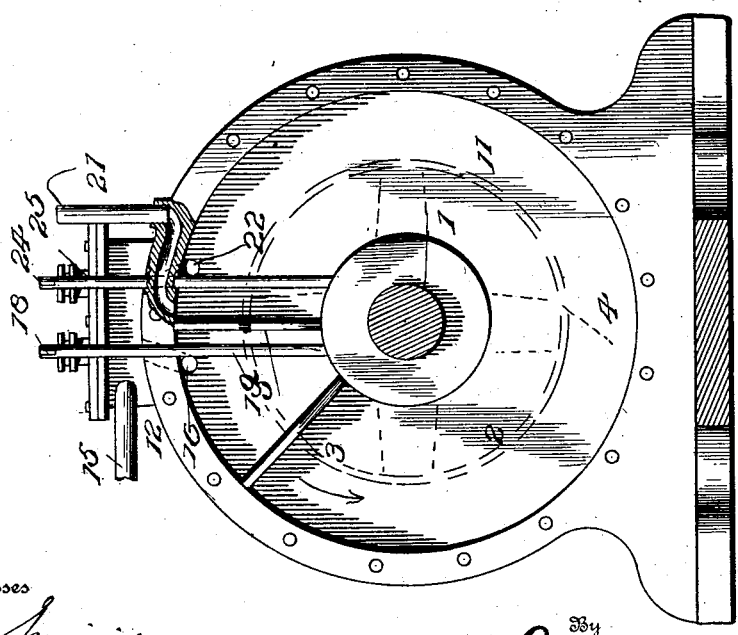

UNITED STATES PATENT OFFICE.

JOHN A. GROVE, OF BLUFFTON, INDIANA.

ROTARY ENGINE.

SPECIFICATION forming part of Letters Patent No. 715,788, dated December 16, 1902.

Application filed August 19, 1901. Serial No. 72,554. (No model.)

*To all whom it may concern:*

Be it known that I, JOHN A. GROVE, a citizen of the United States, residing at Bluffton, in the county of Wells and State of Indiana, have invented certain new and useful Improvements in Rotary Engines; and I do hereby declare the following to be a full, clear, and exact description of the invention, such as will enable others skilled in the art to which it appertains to make and use the same.

This invention has for its object to devise a novel form of rotary engine for effectively utilizing the expansive force of steam in a cylinder separate from the main cylinder for driving the engine, the steam when exhausted from the main cylinder being conveyed into another cylinder to drive a piston working therein by expansive force. The vital feature is the extraction of all or nearly all the energy and force from the steam and the conversion thereof into available power for industrial or other purposes.

The engine consists, essentially, of a series of cylinders, a shaft having pistons arranged to work in the respective cylinders, and valves for controlling the admission of live steam into the main or primary cylinder and exhausting the spent steam therefrom and admitting it into the other cylinder, or, if there be more than one expansion-chamber, into the others in successive order.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a rotary engine embodying the invention. Fig. 2 is a transverse section. Fig. 3 is an end view of the main cylinder with its head omitted. Fig. 4 is a view of the expansion-cylinder, similar to Fig. 3. Fig. 5 is a plan view of the upper portion of the casing, the cover of the steam-chest being omitted. Fig. 6 is a detail view showing the means for positively operating the valves. Fig. 7 is a transverse section of a portion of the casing, showing the abutment and the housing or pocket therefor. Fig. 8 is a detail perspective view of the abutment. Fig. 9 is a section on the line X X of Fig. 5.

Corresponding and like parts are referred to in the following description and indicated in all the views of the drawings by the same reference characters.

The engine comprises a shaft 1 and a plurality of cylinders 2 2ª. The engine-shaft is concentric with reference to the cylinders and is common thereto, passing through the same. The pistons 3 3ª for the respective cylinders are attached in any selected and substantial way to the shaft for rotation therewith and have a screw-tight fit within the cylinders in which they are arranged to operate. The power is taken from the engine-shaft 1 by means of a belt-pulley (not shown) in the usual manner. A laterally-sliding abutment 5 5ª is provided for the respective cylinders 2 2ª and is movable through a radial slot 6 or 6ª, formed in the respective heads 7 7ª of the casing within which is formed the engine-cylinders. The abutments 5 5ª may be mounted in any desired way, so long as they are adapted to move to clear the cylinders and provide for uninterrupted rotation of the respective pistons. In order that the abutments may be protected, they are inclosed in a housing 8 or 8ª, bolted or otherwise secured to the respective heads 7 7ª, the stem of each abutment working through a stuffing-box provided at the outer end of the housing. A lever 9 or 9ª is fulcrumed between its ends to a stud or post projected from the casing, and its outer end has loose connection with the stem of the abutment, whereas its inner end is arranged to work in a cam-groove 10 or 10ª, provided in the shaft 1 or an enlargement thereof. The cam portion of the groove 10 is of such proportion and arrangement as to cause an outward movement of the abutment just prior to the passage of the piston 3 or 3ª thereby, the abutment moving inward the instant the piston has cleared the same and prior to the admission of steam to the cylinder. It is preferred to locate the abutments 5 and 5ª at diametrically opposite points, so as to overcome dead-center. The casing is subdivided by a partition 11, between which and the respective heads 7 and 7ª the cylinders 2 and 2ª are formed. The steam-chest 12 is applied to the casing preferably at the highest point and has communication with the respective cylinders. The chest is partitioned to form compartments 13 and 14, the live steam being admitted into the compartment 13 and the exhaust-steam from the first or main cylinder being admitted into the compartment 14 through the port 22. The steam from a boiler or generator is conveyed to the compartment 13 by means of a pipe 15 and passes from the compartment 13 into the cylinder 2 by means of a port 16, said port being controlled by means of a puppet-valve 17, whose stem is attached to a horizontal lever 18, pivotally connected at its free end to an operating-rod 19, having its lower end bent and arranged to work in a cam-groove 20, formed in an enlargement or hub applied to the shaft 1 for rotation therewith. The live steam is cut off from the cylinder 2 about one-fourth the revolution of the piston 3 and drives the piston the remainder of the revolution by expansive force. Just prior to the completion of the revolution of the piston 3 and before the abutment 5 is moved outward the steam is exhausted from the cylinder 2 into the cylinder 2ª, and an instant later and just after the port 22 from the cylinder 2 into the compartment 14 has been closed the cylinder 2 is relieved of all pressure through the port 21, so that the piston 3 in its next revolution is not retarded by any back pressure, such as would be the case if the cylinder 2 were not relieved of the pressure remaining therein after the spent steam had been exhausted in the second cylinder 2ª. The relief-port 21 for the cylinder 2 is located so as to communicate with the cylinder in the rear of the abutment and as close thereto as possible. The instant the piston 3 passes the inner end of the port 21 all pressure within the cylinder 2 is relieved through the said port 21, which has uninterrupted communication with the atmosphere. As soon as the piston 3 clears the abutment 5 and the latter has moved inward across the cylinder the valve 17 is actuated, so as to admit steam from the compartment 13 of the steam-chest into the cylinder 2, and this valve closes when the piston reaches the predermined point in its revolution at which the steam is to be cut off, so that the piston may be driven the remainder of its revolution by expansive force of the steam.

A port 22 establishes communication between the cylinder 2 and the compartment 14 of the steam-chest and is controlled by a puppet-valve 23, attached to a horizontal lever 24, connected at its free end with an operating-rod 25, whose lower end is bent to enter the cam-groove 20, whereby the valve 23 is positively actuated at the proper times for admitting the steam from the cylinder 2 into the steam-chest and cutting off the same prior to the uncovering of the relief-port 21. When the piston 3 is traveling from the abutment 5 to a point just beyond the port 22, the latter is closed, and any steam or air in advance of the piston escapes through the exhaust 21, which is of material advantage in not offering any resistance to the advance of the piston. When the piston 3 moves to a position just beyond the port 22 and between it and the port 21, the valve 23 is open, thereby permitting the steam in the rear of the piston to pass into the compartment 14 of the steam-chest and thence into the cylinder 2ª. The port 22 is open for an instant only and is closed by the time the abutment 5 moves to admit of the piston 3 passing thereby, and the instant the piston clears the port 21 any steam remaining escapes. A passage or pipe 26 connects the compartment 14 and steam-chest with the lower portion of the cylinder 2ª, so as to drive the piston 3ª. The spent steam from the cylinder 2ª is exhausted through the port 27. Should it be found that the steam exhausted from the cylinder 2ª has any appreciable force, it may be utilized for driving other pistons attached to the same shaft 1 and arranged for operation in cylinders similar to the corresponding parts hereinbefore specified.

For all practical purposes a pair of cylinders have been found to give the desired result and that the steam when exhausted from the second cylinder is possessed of but little or no effective force.

Having thus described the invention, what is claimed as new is—

In a rotary engine, a cylinder, a piston arranged to work therein, a laterally-sliding abutment, means for admitting live steam into the cylinder upon one side of the abutment, means for exhausting the steam from the cylinder upon the opposite side of the abutment for further utilization, and a port for relieving the said cylinder of all pressure the instant the partly-used steam has been exhausted and prior to the admission of the next charge of live steam, substantially as set forth.

In testimony whereof I affix my signature in presence of two witnesses.

JOHN A. GROVE. [L. S.]

Witnesses:
LEVI MOCK,
JOHN MICK.